United States Patent
Yamashita

(10) Patent No.: US 11,763,118 B2
(45) Date of Patent: Sep. 19, 2023

(54) PRINTING MEDIUM PROCESSING SYSTEM AND PRINTING MEDIUM PROCESSING METHOD

(71) Applicant: SEIKO EPSON CORPORATION, Tokyo (JP)

(72) Inventor: Mitsuhiro Yamashita, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/457,676

(22) Filed: Dec. 6, 2021

(65) Prior Publication Data

US 2022/0180136 A1   Jun. 9, 2022

(30) Foreign Application Priority Data

Dec. 7, 2020 (JP) .................. 2020-202750

(51) Int. Cl.
*G06K 15/00* (2006.01)
*G06K 15/10* (2006.01)

(52) U.S. Cl.
CPC ....... *G06K 15/4065* (2013.01); *G06K 15/102* (2013.01)

(58) Field of Classification Search
CPC ..... H04N 1/62; H04N 1/58; H04N 2201/0094
USPC ......................... 358/2.1, 1.9, 1.15
See application file for complete search history.

(56) References Cited

U.S. PATENT DOCUMENTS

| | | | |
|---|---|---|---|
| 7,031,021 B1* | 4/2006 | Lain .................. | H04N 1/52 358/1.9 |
| 2012/0218574 A1* | 8/2012 | Fukuda ............... | H04N 1/6033 358/1.9 |
| 2021/0075929 A1* | 3/2021 | Suzuki .............. | H04W 52/0235 |
| 2022/0092369 A1* | 3/2022 | Yokouchi ........... | H04N 1/6033 |

FOREIGN PATENT DOCUMENTS

| | | | | |
|---|---|---|---|---|
| JP | 2010-252053 A | 11/2010 | | |
| JP | 2012-199832 A | 10/2012 | | |
| WO | WO-2020081435 A1 * | 4/2020 | ........... | G06K 19/027 |

* cited by examiner

*Primary Examiner* — Quang N Vo
(74) *Attorney, Agent, or Firm* — Global IP Counselors, LLP

(57) ABSTRACT

For a plurality of kinds of printing media, spectral information is produced from results of printing of at least five points in paper white of the printing media, black, and three primary colors of coloring and printing materials, and a learned model is generated in advance by machine learning that uses the spectral information as learning data. An identification section that identifies the kinds of the printing media by using the learned model is provided. The kinds of the printing media are identified by applying the spectral information produced from the results of printing of at least five points on a printing target medium on which printing is to be performed to the learned model, and the printing target medium is processed in accordance with the identified kind of the printing target medium. In the case of a new unlearned printing medium, transfer learning is performed to learn the printing medium, and the model is updated.

9 Claims, 9 Drawing Sheets

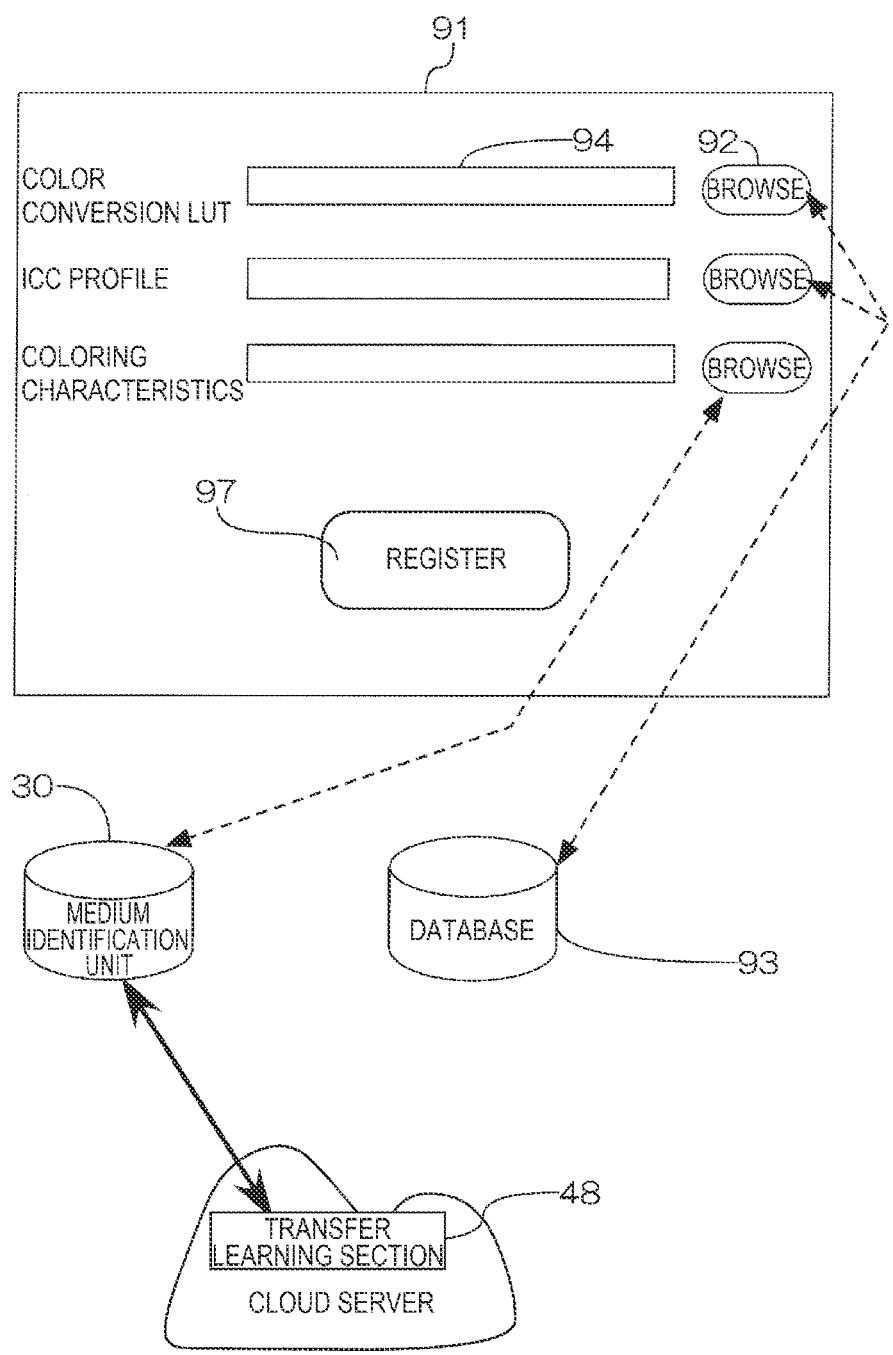

PRINTING MEDIUM PROCESSING SYSTEM AND PRINTING MEDIUM PROCESSING METHOD

The present application is based on, and claims priority from JP Application Serial Number 2020-202750, filed Dec. 7, 2020, the disclosure of which is hereby incorporated by reference herein in its entirety.

BACKGROUND

1. Technical Field

The present disclosure relates to a technology for identifying the kind of a printing medium to process the medium, for example, to perform printing or reproduction.

2. Related Art

In printing using ink, the kind of a printing medium (hereinafter referred to as "medium"), such as a sheet of paper onto which ink is ejected, is determined, and the printing conditions are adjusted accordingly. To this end, it is necessary to determine the kind of the medium. The image processing apparatus described in JP-A-2010-252053 measures color values as the image quality of printed matter, calculates the color gamut characteristics of the medium based on the color values, determines a medium having similar image quality characteristics, and selects an optimal profile.

In the technology described in JP-A-2010-252053, however, parameters (color value, for example) that define image quality characteristics in advance are classified, so that it is necessary to retain, as preset values, parameters of a medium having characteristics apart enough to allow distinction in terms of image quality characteristics, and media cannot be properly classified into categories in some cases. Furthermore, in an attempt to add a new category, a difference in color value is not in some cases large enough to distinguish image quality characteristics, so that it is difficult in such cases to arbitrarily add a new category.

SUMMARY

The present disclosure can be achieved as the following aspects or application examples.

A first aspect of the present disclosure is configured in the form of a printing medium processing system that identifies a printing medium. The printing medium processing system includes a model storage section that handles a plurality of kinds of printing media and stores a learned model generated in advance by machine learning that uses, as learning data, at least five pieces of spectral information produced from locations printed in three primary colors of coloring and printing materials and black and a paper white portion of each of the printing media, and an identification section that identifies the kind of a printing target medium on which printing is to be performed by applying the at least five pieces of spectral information produced from the printing target medium to the learned model.

A second aspect of the present disclosure is configured in the form of a printing medium processing method. The printing medium processing method includes handling a plurality of kinds of printing media and storing a learned model generated in advance by machine learning that uses, as learning data, at least five pieces of spectral information produced from locations printed in three primary colors of coloring and printing materials and black and a paper white portion of each of the printing media, identifying the kind of a printing target medium on which printing is to be performed by applying the at least five pieces of spectral information produced from the printing target medium to the learned model, and processing the printing target medium in accordance with the identified kind of the printing target medium.

BRIEF DESCRIPTION OF THE DRAWINGS

FIG. 9 is a descriptive diagram showing an example of a dialog box to which processing information on a new printing medium is inputted.

DESCRIPTION OF EXEMPLARY EMBODIMENTS

Figure 1:
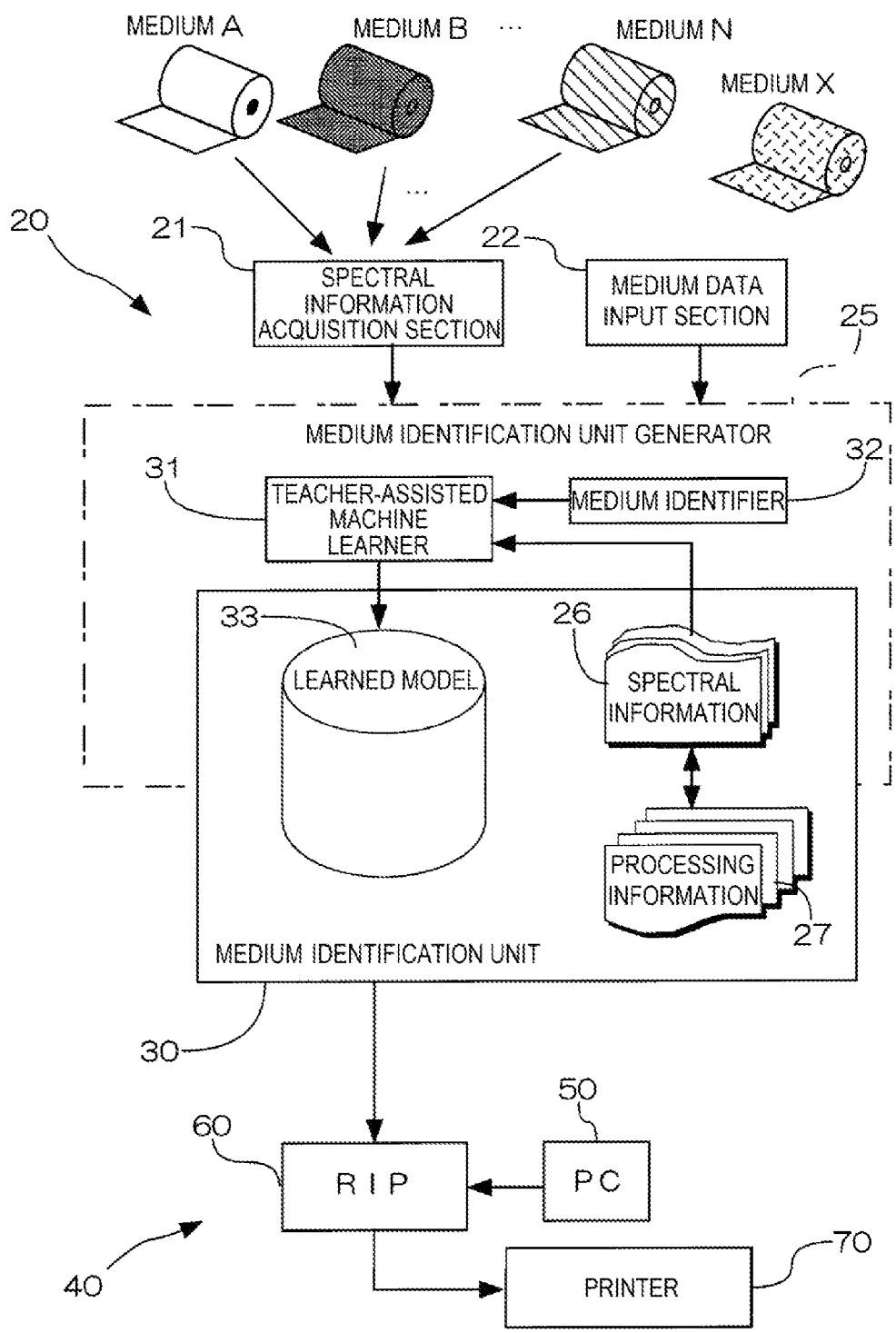
FIG. 1 is a schematic configuration diagram showing a printing medium learning apparatus and a printing medium processing system according to an embodiment.

A. First Embodiment (1) Overall Configuration:

FIG. 1 is a block diagram showing a printing medium processing system 40, which is the embodiment, along with a printing medium learning apparatus 20. Prior to the operation of the printing medium processing system 40, the printing medium learning apparatus 20 generates a medium identification unit 30, which identifies the kind of a printing medium. Once the medium identification unit 30 has been generated, the medium identification unit 30 functions as part of the printing medium processing system 40. The function of generating a learned model 33 by performing machine learning in advance and the function of identifying a medium by using the learned model 33 may be in the first place completely separated as the configuration of the system. In this case, the medium identification unit 30, which includes the learned model 33 generated by the printing medium learning apparatus 20, only needs to be introduced into the printing medium processing system 40. The medium identification unit 30 may be introduced by using a storage medium, such as a memory, or via a network, such as the Internet, or a dedicated line.

The printing medium learning apparatus 20 includes a spectral information acquisition section 21, which acquires spectral information on a variety of printing media (hereinafter also referred to as media), a medium data input section 22, via which a variety of data on the media are inputted, a medium identification unit generator 25, and a teacher-assisted machine learner 31. The printing medium learning apparatus 20 causes the spectral information acquisition section 21 to acquire the spectral information on a plurality of kinds of media A, B, . . . , N and stores the acquired spectral information as spectral information 26.

Figure 2:
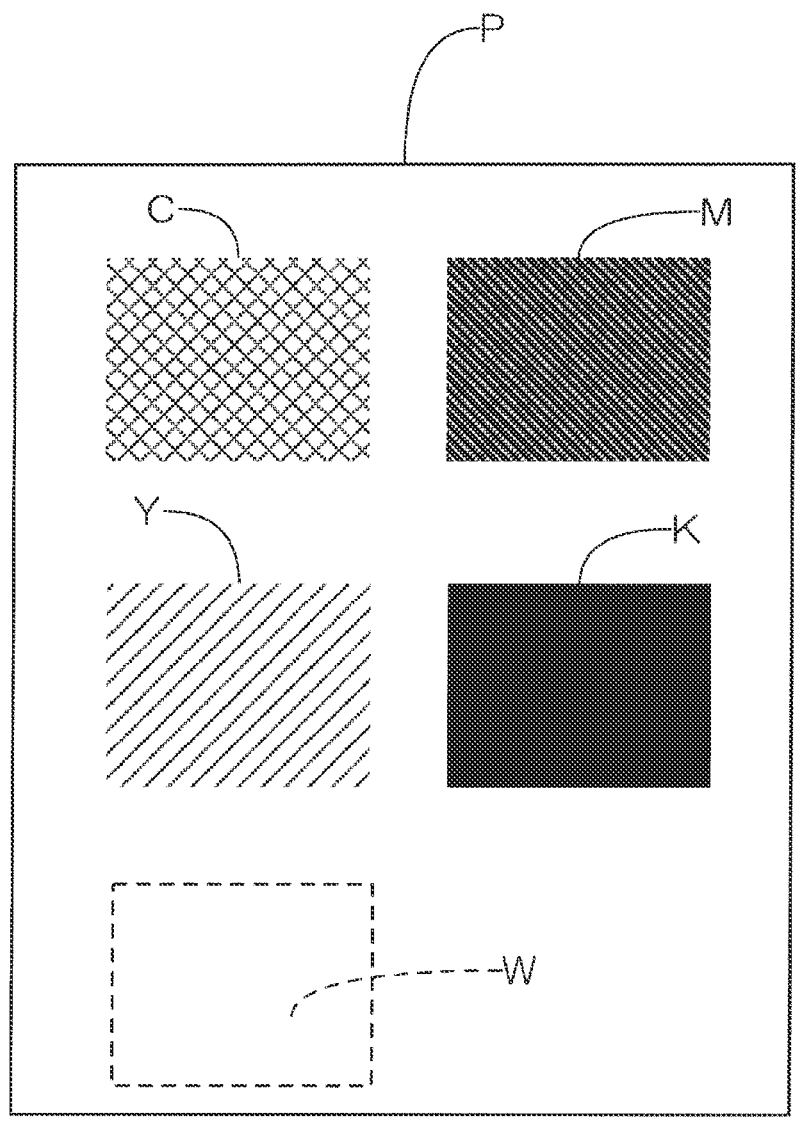
FIG. 2 is a descriptive diagram showing an example of patches used to acquire spectral information.

FIG. 2 is a descriptive diagram showing an example of patches used to acquire spectral information on the media. In the present embodiment, areas each having a predetermined size are actually printed on a printing medium P with a cyan ink producing cyan C=100, a magenta ink producing magenta M=100, a yellow ink producing yellow Y=100, and a black ink producing black K=100, and the spectral information at each of the areas is acquired along with the spectral information at a paper white area W. The spectral information may be either spectral reflectance or spectral transmittance on a wavelength basis or both. Furthermore, the spectral information is not limited to spectral reflectance or any other parameter and may instead be an image captured with a spectrum camera capable of capturing images of the printed printing medium P in a predetermined wavelength range (band) including at least part of the wavelengths of the visible light. The images captured with the spectrum camera are provided as a set of monochromatic images captured on a wavelength band basis.

Separately from the spectral information 26, medium data on the printing media are inputted via the medium data input section 22. The medium data include medium identifiers 32, which identify the kinds of the printing media, and processing information 27. The medium identifiers 32 are identifiers for identifying the media to which spectral information have been inputted. The processing information 27 includes a variety of data required for printing using the medium, for example, an LUT for color conversion and an ICC profile required for printing on a printing medium that is the medium, and a duty limit value representing the upper limit of the amount of ink to be applied.

The teacher-assisted machine learner 31 defines data on the spectral reflectance and the medium identifiers 32 as teacher data and uses the spectral information 26 on the plurality of kinds of printing media A, B, . . . , N to learn a model for identifying the printing medium. The learned model 33 generated as a result of the learning, along with the spectral information 26 and the processing information 27, forms the medium identification unit 30. The operation and configuration of the medium identification unit generator 25, which performs teacher-assisted machine learning, will be described later.

The thus generated learned model 33 acts as the medium identification unit 30, which identifies the kinds of the media by using the spectral information as an input in the printing medium processing system 40, which will be described later. Once the learning for the learned model 33 has been made and the medium identification unit 30 has been generated, the medium identification unit 30, along with a computer (hereinafter abbreviated to "PC") 50, which instructs printing, a raster image processor (hereinafter simply abbreviated to "RIP") 60, and a printer 70, forms the printing medium processing system 40. When the PC 50 outputs data, such as an image to be printed by the printer 70, the RIP 60 receives the data and develops the data into a raster image printable by the printer 70. In this process, the RIP 60 receives the processing information corresponding to the kind of the printing medium P on which printing is to be performed from the medium identification unit 30 and uses the processing information to generate a raster image. That is, in the present embodiment, the raster image outputted by the RIP 60 is formed of dot data representing the on/off status of each ink loaded in the printer 70. The RIP 60 may in the first place store the processing information corresponding to existing printing media P in advance, receive information on the kind of the printing medium P from the medium identification unit 30, and generate the dot data.

Figure 3:
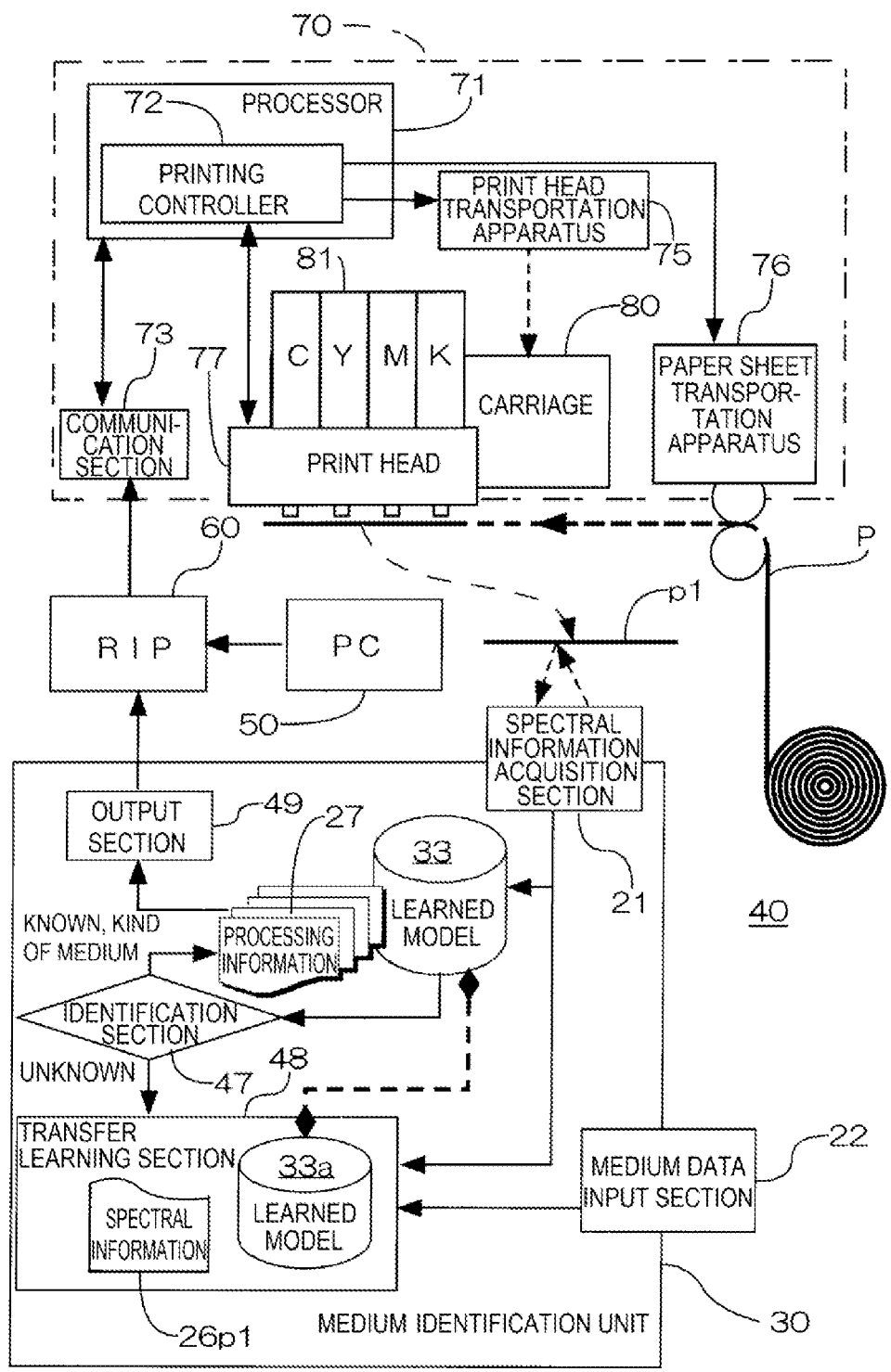
FIG. 3 is a schematic configuration diagram of a printing processing system including a printer.

FIG. 3 shows a detailed configuration of the printing medium processing system 40. In addition to the spectral information acquisition section 21, the medium data input section 22, the spectral information 26, the processing information 27, and the learned model 33, which have already been described, the medium identification unit 30 includes an identification section 47, a transfer learning section 48, and an output section 49. When the spectral information acquisition section 21 acquires the spectral information on a printing medium p1, on which printing is to be performed, (hereinafter referred to as printing target medium), the identification section 47 defines the spectral information as an input and uses the learned model 33 to identify the printing medium. The identification section 47 evaluates whether the printing target medium p1 is a known or unknown kind of printing medium based on the acquired spectral information, and when the result of the evaluation shows that the printing target medium p1 is a known kind of printing medium, the identification section 47 further identifies the kind of the printing medium. Based on the results of the identification, the medium identification unit 30 outputs the processing information 27 according to the kind of the corresponding printing medium to the RIP 60 via the output section 49. When the printing target medium p1 is an unknown kind of printing medium, the transfer learning section 48 performs transfer learning using an existing learned model 33 to newly generate a transfer learning complete model 33a having undergone the learning for the unknown printing target medium p1. The original learned model 33 is replaced with the transfer learning complete model 33a.

The printer 70 includes a processor 71, which includes a printing controller 72, which controls printing, and controls the entire printer 70, a communication section 73, which communicates with the RIP 60, a print head 77, which ejects ink droplets to perform printing on the printing medium P, a print head transportation apparatus 75, which transports the print head 77 along with a carriage 80, in which the print head 77 is incorporated, and a paper sheet transportation apparatus 76, which transports the printing medium P, as shown in FIG. 3. Ink cartridges 81 are incorporated in the carriage 80 and each supply ink to the nozzle for each color provided in the print head 77. In the present embodiment, the ink cartridges 81 house the ink producing cyan C, the ink producing magenta M, and the ink producing yellow Y, which form one combination of the three primary colors in printing, and the ink producing black (real black) K. The printer 70 may instead house inks producing colors other than the three primary colors, such as special color inks, for example, red, blue, and green inks, or light color inks, for example, light magenta and light cyan inks to perform printing.

In the present embodiment, the printing medium P is a rolled sheet wound in the form of a roll, and when the rolled sheet is loaded into the printer 70, areas colored with cyan C, magenta M, yellow Y, and black K shown in FIG. 2 are printed on part of the rolled sheet, which is the printing target medium p1. The printing target medium p1 on which the printing has been performed is used as the patches along with the paper-white area W for acquisition of the spectral information.

In the present embodiment, the printer 70 is what is called an inkjet serial printer and may instead be a printer other than an inkjet printer, for example, what is called a page printer, such as a laser printer. The printer 70 may still instead be a thermal sublimation printer. Coloring and printing materials are inks in inkjet printers and toners in laser printers. A representative combination of the three primary colors of the coloring and printing materials is the aforementioned combination of cyan, magenta, and yellow, but not necessarily, and any combination of colors of coloring and printing materials can be used as long as colors contained in an image to be printed by the printer can be expressed.

In the present embodiment, a spectral reflectometer is used as the spectral information acquisition section 21. The spectral information acquisition section 21, which is a spectral reflectometer, is provided with an LED, which serves as a light emitter that radiates light that belongs to the visible light wavelength range, and a sensor, which serves as a light receiver that detects the intensity of the light outputted from the LED and reflected off the printing medium P in each predetermined wavelength range, for example, of 10 nm. In addition to the spectral reflectance, spectral transmittance, which represents the proportion of light that passes through the printing medium P, may instead be used as the spectral information. In this case, an LED for light emission and a sensor for light receipt may be provided in positions that sandwich the printing medium P.

(2) Configuration of Teacher-Assisted Machine Learner 31:

In the present embodiment, the teacher-assisted machine learner 31 defines the data on the spectral reflectance of the variety of printing media P and the identifiers indicating the kinds of the printing media P corresponding to the data on the spectral reflectance as the teacher data and uses a training model to perform the machine learning. The machine learning takes advantage of the fact that the characteristics of spectral reflectance vary in accordance with the kind of the printing medium P. In the case of white sheet to which no fluorescence whitener has been added, a change in reflectance tends to be small in each wavelength region. On the other hand, in the case of a white sheet to which a fluorescence whitener has been added, the reflectance tends to increase in a short wavelength region. The spectral reflectance of the printing medium P thus contains information on the color of the surface of the printing medium P, information on the presence or absence of a fluorescence whitener, and other pieces of information.

Figure 4:
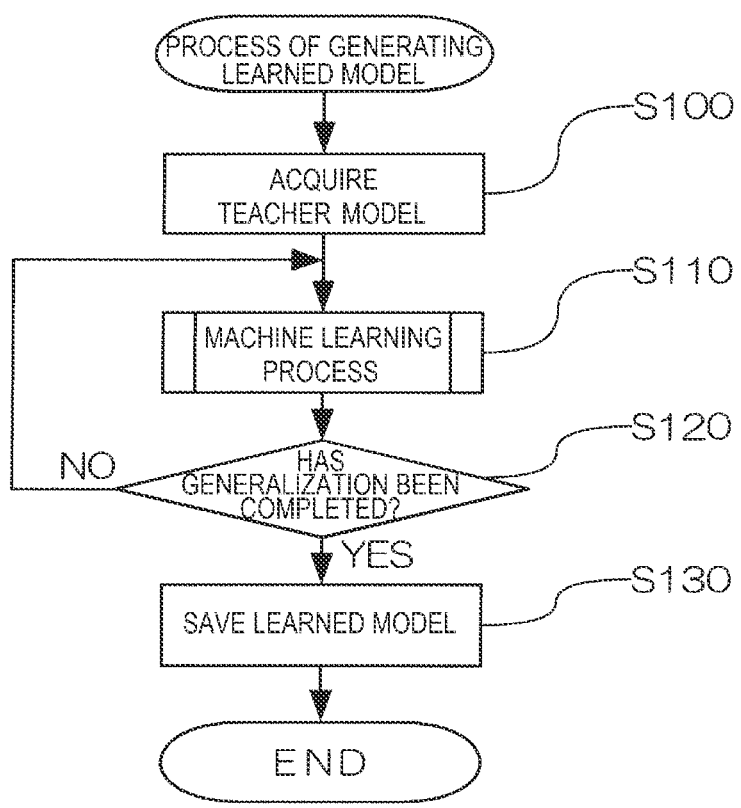
FIG. 4 is a flowchart showing an example of a process carried out by the printing medium learning apparatus.

FIG. 4 is a flowchart showing the process in which the teacher-assisted machine learner 31 performs the machine learning to generate a learned model. By the time the process is initiated, the teacher data that associates the data on the spectral reflectance of the plurality of kinds of the printing media P with the medium identifiers 32, which identify the kinds of printing media P, has been collected. The process of generating a learned model is carried out based on the teacher data.

When the process is initiated, the teacher data is first acquired (step S100). The teacher data has been collected in advance prior to the process, as described above. It is assumed in the present embodiment that the data on the spectral reflectance, which form the teacher data, have been collected for the 14 kinds of media, the medium A to the medium N, and stored in a memory. The number of kinds of media may be greater or smaller in the first place. Once the teacher data is acquired, a machine learning process using a training model (step S110) is subsequently carried out until generalization of the training model is complete (step S120). The learned model 33 is generated by providing the training model with the teacher data and performing the machine learning, and the generated learned model 33 is eventually saved. The saved learned model 33 is incorporated into the medium identification unit 30 and used to identify the kind of the printing medium P.

Figure 5:
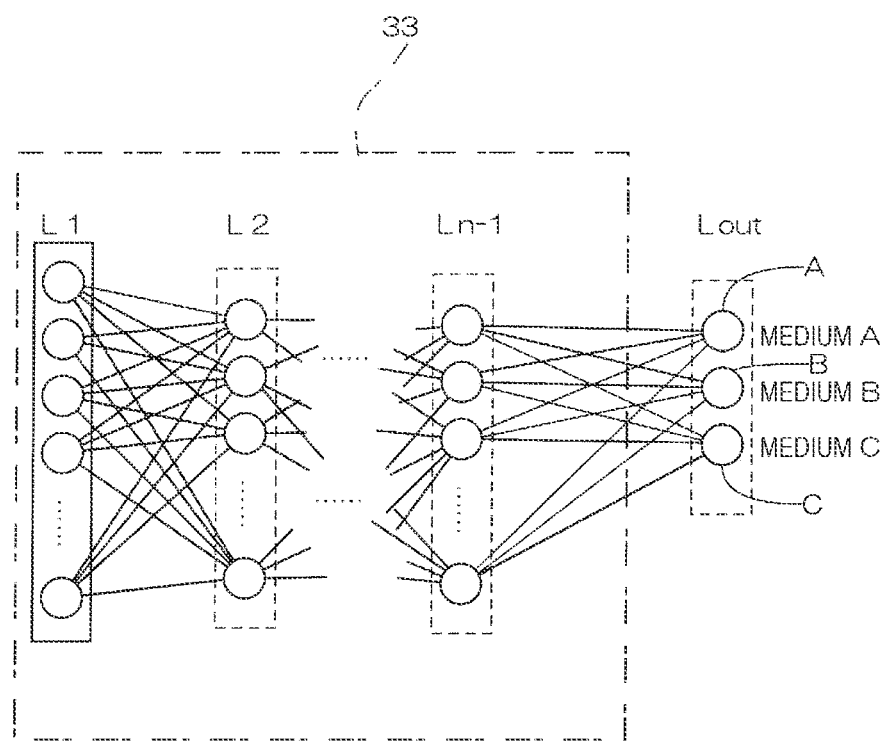
FIG. 5 describes an overview of teacher-assisted machine learning.

The training model for machine learning can be defined in a variety of manners. FIG. 5 diagrammatically shows an example of a model used in the present embodiment. In FIG. 5, entire n CNN layers are shown as boxes L1 to Ln−1, and nodes in a normal neural network are shown as white circles. In the present embodiment, the data on the spectral reflectance are expressed by using a CNN (convolutional neural network), and it is also acceptable to use other models, such as a variety of neural networks including a capsule network and a vector neural network. As an example, a configuration using a vector neural network shown in another application filed by the applicant, Japanese Patent Application No. 2020-94205, can be presented. In a model of the vector neural network type, the output from intermediate layers can be used. Vector neural networks that allow the use of the output from intermediate layers are known networks.

The first layer L1 is provided with a plurality of nodes via which the values of the reflectance at fixed wavelengths are inputted. In the present system, the values of the spectral reflectance at fixed wavelengths indicated by the data on the spectral reflectance are used as data to be inputted to the nodes of the first layer L1, which is an input layer, and final output data relating to the data on the spectral reflectance is outputted from the final output layer Ln−1. The reflectance is a value greater than or equal to zero but smaller than or equal to one. The data on the spectral reflectance can be replaced with the values of transmittance at fixed wavelengths. The two types of data can still instead be used. When both the spectral reflectance and the spectral transmittance are used, two training models may be provided, intermediate output data on the spectral reflectance and intermediate output data on the spectral transmittance may be outputted from the final layers of the models, and the two outputs may be used as the outputs from the overall final output layer Ln−1.

The output via each node of the first layer L1 is weighted by a predetermined amount and connected to the corresponding node of the following second layer. The same holds true for the layers after the second layer L2 up to the (n−2)-th layer. The process of correcting the weightings between the nodes between the layers by using the teacher data is repeated to complete the learning and generate the learned model 33. This process will be described below in detail.

In the learning, the teacher-assisted machine learner 31 inputs one of the teacher data into the training model and calculates the output values from the final output layer Ln−1. In this process, the correspondence between the nodes of the final output layer Ln−1 and the kinds of the media is determined in advance. For example, it is assumed that when the printing medium P is the medium A, the learning is so performed that a value close to a value of 1 is outputted via the node A. One set of teacher data is provided to the training model, and the teacher-assisted machine learner 31 assesses the outputted values via the nodes A to N of the final output layer Ln−1 by using a loss function. That is, when the teacher data relates, for example, to the medium A, the state in which the value at the node A is one and the values at the other nodes B to N are zero is set as a target state, and the differences between the target values and the actual output values (learning errors) are identified by the loss function. The teacher-assisted machine learner 31 then corrects the weightings between the nodes. After the correction, the learning errors are determined again by using the loss function, the differences from the previously determined learning errors (derivatives) are determined, whether the learning errors have been reduced by the weightings is evaluated, and the weightings are further corrected.

A variety of loss functions can be employed to determine the learning errors. For example, a cross-entropy error can be employed. The aforementioned process of calculating the loss function is carried out for all or part of the data contained in the teacher data, and the loss function in a single learning session is expressed by the average or sum of the results of the calculation process. Once the learning errors in a single learning session are produced, the teacher-assisted machine learner 31 corrects the weightings by using a default optimization algorithm, for example, a probabilistic gradient descent method.

Once the weightings have thus been corrected by a default number of times for all the teacher data, the teacher-assisted machine learner 31 evaluates whether or not the generalization of the training model has been complete (step S120). That is, the teacher-assisted machine learner 31 acquires the degree of agreement between the input to the learning model and the output therefrom by using the teacher data and determines that generalization has been complete when the degree of the agreement is greater than or equal to a prespecified threshold.

When the result of the evaluation shows that the generalization is not complete, the machine learning process (step S110) is repeated. That is, the process of further correcting the weights is carried out, and the computation and assessment of the learning errors by using the error function is repeated. In addition to the aforementioned teacher-assisted machine learning of the kind of the printing medium P, the teacher-assisted machine learner 31 may further carry out other processes, such as examination of the appropriateness of hyperparameters.

The nodes of the final output layer Ln-1 correspond to the kinds of the printing medium P to be identified (medium A, medium B, . . . , medium N). When one set of teacher data is provided, the teacher data is used to normalize the sum of the output values via the nodes of the final output layer Ln-1 in such a way that the sum has a value of one. It can be estimated that the kind of the printing medium P corresponding to a node where the output value from the final output layer Ln-1 is maximized is the kind of the printing medium P from which the teacher data inputted to the input layer L1 has been acquired. Ideally, when the teacher data have been provided, it is desirable that the output via one node of the final output layer Ln-1 has the value of one and the outputs via the other nodes have the value of zero so that the printing medium P can be identified, but the output at each node of a multilayer neural network that provides a plurality of kinds of outputs is typically greater than zero but smaller than one. The maximum of the output values at the nodes of the final output layer Ln-1 is therefore handled as a parameter indicating the possibility that the printing medium P is a medium corresponding to the node via which the maximum is outputted.

As described above, in the teacher-assisted machine learner 31, the learning is performed by providing the training model with the teacher data to generate the learned model 33. As for the kind of the printing medium P on which the teacher-assisted machine learning is performed, the processing information required for printing is prepared for each of the kinds of the learned printing media P. The processing information is inputted via the medium data input section 22 for each of the kinds of printing media P. Since the processing information 27 varies in accordance with the type of the printer 70, it is conceivable that there is a case in which it is difficult to store the processing information 27 for all kinds of printing media P in the printer 70. Therefore, for some kinds of printing media P, it is also useful to store the corresponding processing information 27 in a cloud space and read the processing information as required. It is also acceptable to provide a cloud space with a dedicated site that stores the processing information 27 and prepare the processing information 27 in the dedicated site in the first place.

Examples of the processing information 27 may include

[1] a color conversion LUT, which converts image data into the amounts of coloring and printing materials, the amounts of inks in the description,

[2] an ICC profile,

[3] heating control information, which is the conditions under which the printing medium is heated after printing,

[4] medium transportation information, which is the conditions under which the printing medium is transported,

[5] a duty limit value indicating the upper limit of the amount of ink applicable to the printing medium, and

[6] information on the likelihood of cockles of the printing medium.

It is not necessarily required to prepare all the pieces of information as the processing information 27, and necessary pieces of processing information may be specified as appropriate in accordance with the type and function of the printer 70 to be used. Since the color conversion LUT and the ICC profile have significant impacts on the coloring characteristics of printed matter, it is desirable that the processing information contains these two parameters.

Therefore, when the medium identification unit 30 identifies the printing target medium p1 on which printing is performed as a known medium, the medium identification unit 30 outputs to the RIP 60 processing information necessary for the printing performed on the printing target medium p1. On the other hand, when the medium identification unit 30 identifies the printing target medium p1 on which printing is performed as an unknown medium, the medium identification unit 30 updates the learned model 33 by using the transfer learning performed by the transfer learning section 48. To perform the transfer learning, the medium identification unit 30 only needs to save the learned model 33 and the spectral information on the unknown printing target medium p1 and does not need to retain the spectral information, which is the data on the spectral reflectance of each of the kinds of the plurality of learned media A to N. When the transfer learning section 48 determines that the printing target medium p1 on which printing is performed is not a known medium, the transfer learning section 48 performs the transfer learning with a new medium identifier X attached to spectral information 26p1 on the printing target medium p1 and updates the learned model 33 by replacing it with the learned transfer-learning complete model 33a. The actual transfer learning will be described later.

Figure 6:
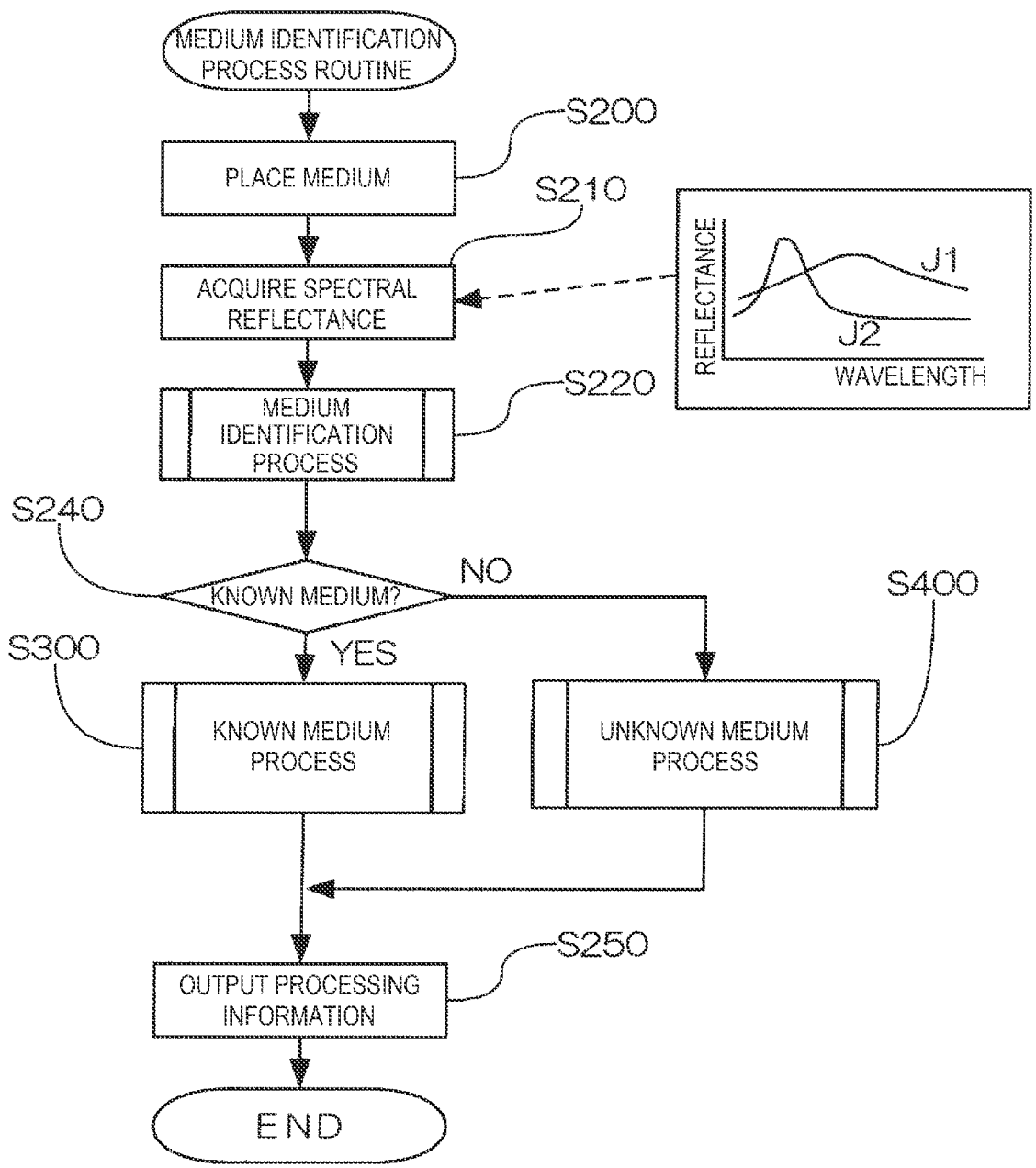
FIG. 6 is a flowchart showing an example of a medium identification process carried out by the printing medium processing system.
Figure 7:
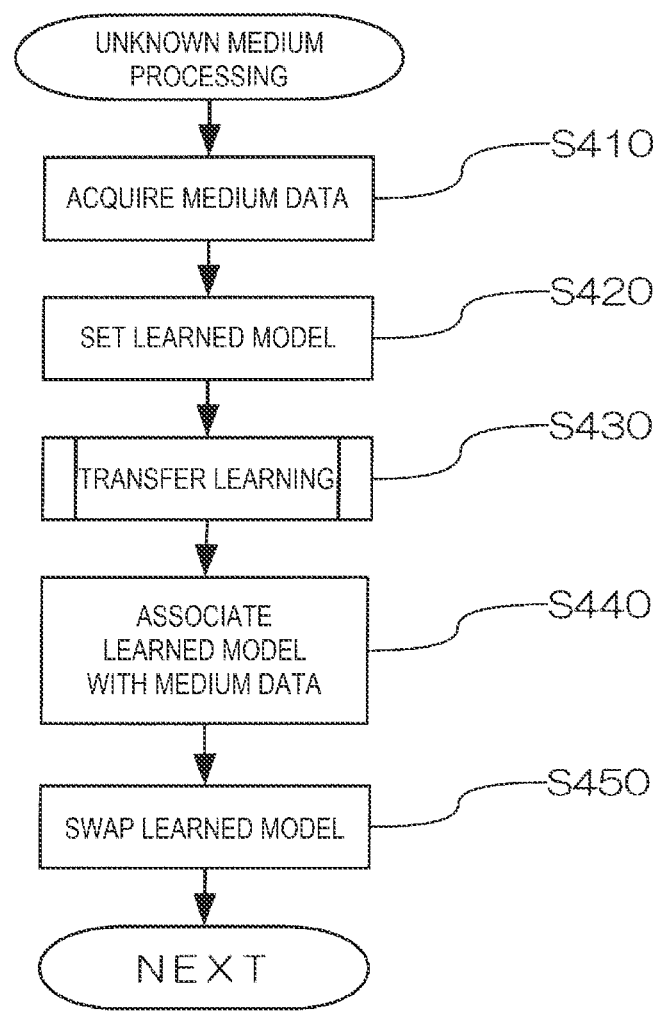
FIG. 7 is a flowchart showing an overview of unknown medium processing.

(3) Medium Identification Process:

FIG. 6 shows an overview of a medium identification process carried out by the medium identification unit 30 prior to printing performed by the printer 70. Before the process routine shown in FIG. 6 is initiated, the medium identification unit 30 has stored the learned model 33 and the process information 27 corresponding to the plurality of kinds of printing media P. When the processes in FIG. 6 are initiated, the process of placing the printing media P (on which the patches shown in FIG. 2 is printed) on the spectral information acquisition section 21 is first carried out (step S200).

Subsequently, the spectral information acquisition section 21 is used to acquire the spectral reflectance of the printing media P (Step S210). The spectral reflectance is acquired in the form of a set of reflectance data within wavelength ranges produced by segmenting the range of the wavelengths of the light being radiated into wavelength ranges each having a predetermined width, 10 nm in this case. The solid line J1 shown in FIG. 6 by way of example indicates an example of the spectral reflectance of a typical printing sheet. On the other hand, the printing medium P to which a fluorescence whitener has been applied has reflectance in a short wavelength region higher than that of a typical print sheet, as indicated by the solid line J2 by way of example. Instead, the spectral reflectance may be measured by the spectral information acquisition section 21 provided in the medium identification unit 30 or may be measured by a dedicated measurement apparatus and then acquired by the medium identification unit 30, for example, through communication.

The medium identification unit 30 subsequently carries out the medium identification process of identifying the kind of the printing medium by using the data on the spectral reflectance acquired in step S210 and the learned model 33 (step S220). The medium identification unit 30 inputs the acquired data on the spectral reflectance to the learned model 33 to obtain output values (see FIG. 5). Based on the output values from the intermediate and final layers of the learned model 33, the medium identification unit 30 acquires identifiers and parameters representing the kinds of the printing media P.

Thereafter, based on the acquired parameters, the medium identification unit 30 evaluates whether or not the printing medium P on which printing is performed is a known media (step S240). A user may always be requested in the first place to determine that the printing medium P is a known medium by looking at the displayed parameters and the kinds of the media (identifiers) obtained from the output values from the intermediate layers and the final output layer Ln-1. In this case, the user evaluates whether or not the printing medium P is a known medium.

When the result of the evaluation shows that the printing medium P is a known medium, a known medium printing condition setting process (step S300) is carried out, whereas when the result of the evaluation shows that the printing medium P is not a known medium, an unknown medium printing condition setting process (step S400) is carried out. In the known medium printing condition setting process (step S300), the processing information 27 corresponding to the printing medium P on which printing is performed is identified and read. On the other hand, in the unknown medium printing condition setting process (step S400), after the transfer learning, which will be described later, is performed, the process information 27 suitable for the printing target medium p1 is identified and prepared. After either of the printing condition setting processes is carried out, the processing information prepared in the process is outputted to the RIP 60 (step S250). Having received the processing information, RIP 60 uses the processing information to convert image data inputted from the PC 50 into a raster image, dot data representing the on/off status of dots of each color ink in this case, and outputs the dot data to printer 70 for printing.

(4) Unknown Medium Processing:

The contents of the unknown media printing condition process routine (step S400) carried out by the medium identification unit 30 will be described. When the medium identification unit 30 determines that the printing target medium p1 is an unknown medium, the medium identification unit 30 first prompts the user to input medium data containing a new medium name and acquires the inputted medium data (step S410). The medium data contains the medium identifier representing the kind of the new medium, the name of the medium, the processing information required when the medium is used, and other pieces of information. The processing information may be entirely inputted by the user via the medium data input section 22. Instead, the processing information 27 on the existing printing media P may be used with reference to the parameters outputted by the medium identification unit 30, or the processing information 27 may be used with part thereof corrected.

Figure 8:
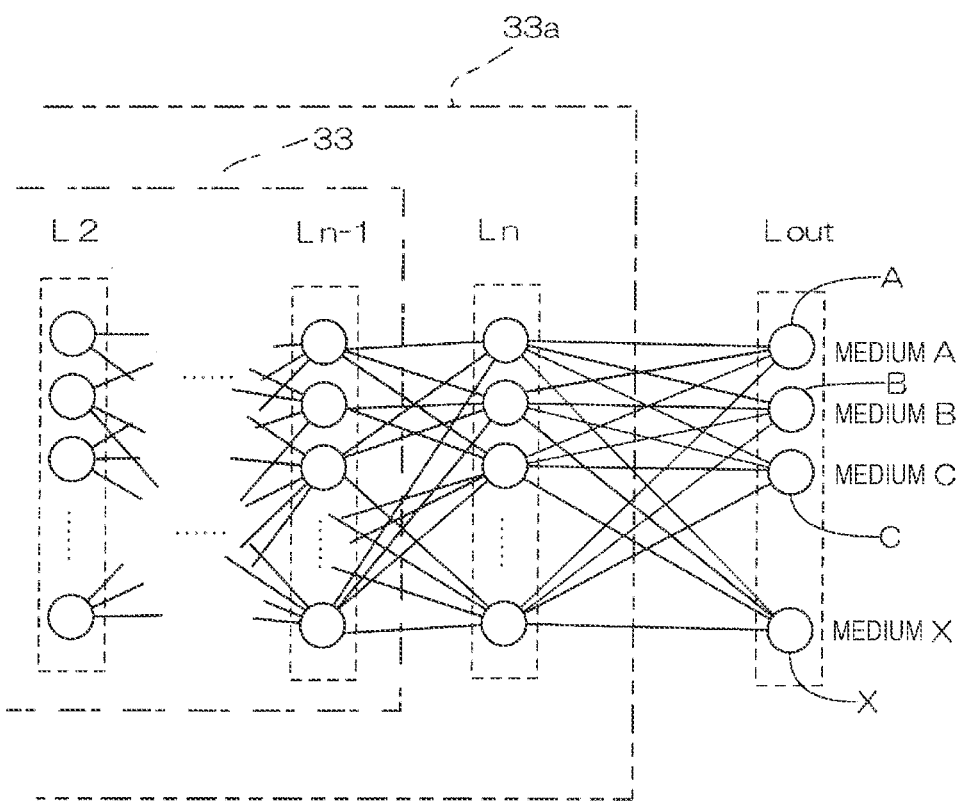
FIG. 8 describes transfer learning.

Once the medium data on the new medium has been acquired in response to the user's input, the process of setting the learned model 33 is then carried out (step S420). This process, which is for the preparation for the transfer learning, is the process of setting the learned model 33 having been used so far to identify the printing medium P. Subsequently, the transfer learning is performed by using the spectral information 26p1, which is acquired when the printing medium P is determined to be an unknown medium, and the acquired medium identifier 32 (step S430). In the transfer learning, the weightings between the layers of the model having already been learned are used as they are, a new layer is further added to the final layer, and only the weightings between the new layer and the final layer are learned. The reason for this is that in the machine learning using, for example, CNN, structuralization from lower-order spectral features gradually to features to be identified occurs as the layer in operation transitions from a layer close to the input toward the final output layer. Since the learned model 33 uses the inputted spectral information to attempt to output the result of the identification of the printing medium P irrespective of the kind of the printing medium P, a known medium or an unknown medium, a new layer Ln is further provided at the output of the output layer Ln-1 of the existing learned model 33, as diagrammatically shown in FIG. 8, and the weightings between the two layers are adjusted to perform the learning in such a way that a new medium X is selected.

Since the transfer learning is thus performed on the new medium to generate a transfer learning complete model 33a with the newly added layer Ln, an output X from the model is associated with a medium identifier representing the new medium and the processing information, such as the color conversion LUT and the ink duty required when printing is performed on the medium (step S440). As the processing information, processing information prepared for a similar medium may be selected by using a dialog box 91 shown in FIG. 9 by way of example. That is, the dialog box 91, to which the processing information is inputted, is displayed by the media data input section 22, and the user is prompted to select processing information via the dialog box 91. In the example shown in FIG. 9, the color conversion LUT and the ICC profile are set as the processing information. In this case, when the user selects a "Browse" button 92, pre-prepared color conversion LUTs and ICC profiles are read from a database 93, which stores the LUTs and profiles, and a plurality of candidates are displayed. When the user selects one from the plurality of candidates, the selected file is displayed in a box 94. When the coloring characteristics are unknown, pressing the "Browse" button displays media having similar coloring characteristics. When the medium identification unit 30 determines that the medium P is an unknown medium and registers the unknown medium as a new medium, the medium identification unit 30 performs the transfer learning described above to newly generate the transfer learning complete model 33*a* and associates the processing information, such as the selected LUT and ICC profile, with the new medium that has been identifiable. It is assumed in FIG. 9 that the transfer learning section 48 is located in a cloud space. The medium identification unit 30 instructs the transfer learning section 48 in a cloud server via a network to perform the transfer learning, and the transfer learning section 48 sends back the result of the transfer learning. After the selections described above, a "Register" button is pressed to update the learned model 33 to the learned model 33*a* generated by the transfer learning, and the selected processing information is associated with the new printing medium X.

When the processing information prepared for similar printing media are not used as they are, processing information on a printing medium highly similar in terms of spectral information may be displayed as default processing information, and this processing information may be used or corrected, registered as the processing information for the new medium, and associated with a medium identifier. The learned model in the medium identification unit 30 is then replaced with the new learned model 33*a* generated by the transfer learning to update the medium identification unit 30 (step S450). The medium identification unit 30 completes the unknown medium processing by carrying out the processes described above and exits to "NEXT" to terminate the routine.

The printing medium learning apparatus 20 and the printing medium processing system 40 described above acquire the spectral reflectance of a plurality of kinds of printing media P by using the patches (FIG. 2) formed of the five color areas in total, the four areas colored with the three primary color (cyan C, magenta M, and yellow Y) inks and the black K ink used for printing performed by the printer 70 and the area having the paper white W, and identifies the kind of a printing medium by using the result of teacher-assisted machine learning performed in advance based on the acquired spectral reflectance. There is therefore no need to use a special parameter that allows distinction of image quality characteristics, whereby the kind of the printing medium P can be identified in the simple method.

Moreover, when the printing target medium p1 on which printing is to be performed is of a kind that has not undergone machine learning before, and the kind of the printing target medium p1 cannot be identified, the features of the new printing medium can be learned by the transfer learning, which requires less man-hours, for example, than fine tuning, and the learned model 33 can be updated to a learned model that can identify the new printing medium. Since a new learned model is generated by the transfer learning, there is no need to save the spectral information and other pieces of information used in the initial learning.

To perform printing on a thus identified printing medium, the processing information associated with the identified printing medium, such as the color conversion LUT and the ICC profile, is used, whereby printing suitable for the coloring characteristics of the printing medium can be performed, so that the color reproduction and image quality of the printed matter can be enhanced.

In the embodiment described above, data outputted by the PC 50 is converted by the RIP 60 into a raster image. The conversion into a raster image may instead be performed by a printer driver in the PC 50 without using the RIP 60. The printer 70 itself may have color conversion and binarization functions, and the medium identification unit 30, which identifies the kind of a printing medium, may also be incorporated in the printer 70. The printing can thus be performed simply by attaching a memory card that stores image data to the printer 70 or by sending image data from a portable device, such as a tablet terminal, to the printer 70.

B. Other Embodiments (1) The printing medium processing system according to the present disclosure can be implemented, for example, in the following aspects: A first aspect is an aspect in the form of a printing medium processing system that classifies printing media. The printing medium processing system includes a model storage section that handles a plurality of kinds of printing media and stores a learned model generated in advance by machine learning that uses, as learning data, at least five pieces of spectral information produced from locations printed in three primary colors of coloring and printing materials and black and a paper white portion of each of the printing media, and an identification section that identifies the kind of a printing target medium on which printing is to be performed by applying the at least five pieces of spectral information produced from the printing target medium to the learned model. As a result, for the plurality of kinds of printing medium, the spectral information produced from the at least five printing results including paper white of the printing medium, black, and the three primary colors of the coloring and printing materials can be acquired, and the kind of the printing medium can be identified by using the result of teacher-assisted machine learning performed in advance based on the acquired spectral information. There is therefore no need to use a special parameter that allows distinction of image quality characteristics, and the kind of a printing medium can be identified in the simple method.

The printing medium processing system only needs to be capable of identifying the kind of the printing medium and may be implemented as a system including a printer or any other apparatus that performs printing on a printing medium or as a processing system that does not involve printing. For example, the printing medium processing system may be applied to systems that recycle used sheets of paper and systems that transport printing media.

(2) In the configuration described above, the three primary colors of the coloring and printing materials described above may be cyan, magenta, and yellow. Most printers that use inks to perform multiple-color printing can thus readily perform printing necessary for the identification. The three primary colors of the coloring and printing materials are not necessarily limited to cyan, magenta, and yellow, which are typically used, and may be any combination of three primary colors used in printing. The combination of three primary colors does not need to cover the entire visible region. The spectral information only needs to contain information acquired at the five points described above and may also contain information acquired at color points other than the five points described above.

(3) In the configuration described above, the spectral information used as the learning data may include at least one of the spectral reflectance or spectral transmittance obtained by measuring the colors of the results of the printing or a spectral image obtained by capturing images of the results of the printing. The spectral information can thus be readily acquired. The spectral reflectance and the spectral transmittance may respectively be used alone or may be used together. When both the spectral reflectance and the spectral transmittance are used, two training models may be provided in the machine learning, and intermediate output data on the spectral reflectance and intermediate output data on the spectral transmittance may be outputted from the final layers of the models learned in terms of the spectral reflectance or transmittance, and the two types of data may be outputted from the overall final output layer. Similarly, a spectral image may be handled alone or in conjunction with any other type of spectral information. Each type of spectral information may be acquired for a wavelength range that includes at least part of wavelengths of the visible light. The wavelength range may include wavelengths shorter than those of the visible light. The reason for this is that a fluorescence whitener is added in some cases to a printing medium, and when a fluorescence whitener is added, characteristic portions may occur in spectral information at short wavelengths of the visible light.

(4) In the configuration described above, the processing information used in printing using the printing medium described above includes

[1] a color conversion LUT, which converts image data into the amounts of coloring and printing materials,

[2] an ICC profile,

[3] heating control information, which is the conditions under which the printing medium is heated after printing,

[4] medium transportation information, which is the conditions under which the printing medium is transported,

[5] a duty limit value indicating the upper limit of the amount of ink applicable to the printing medium when coloring and printing materials are inks for printing, and

[6] information on the likelihood of cockles of the printing medium.

The printing medium processing system may further include a processing information storage section that stores at least one kind of the pieces of information described above in advance in association with the kind of the printing medium, and a processing section that reads, when the kind of the printing target medium on which printing is to be performed is identified by the identification section, the associated processing information in accordance with the kind of the printing target medium and uses the read processing information to process the printing target medium. The result of the identification of the kind of the printing medium can thus be used to perform printing under appropriate conditions for the printing medium.

Out of the pieces of processing information described above, the heating control information is information on the temperature and period of the heating that is performed in some cases after printing. The heating can affect not only the coloring materials but also the printing medium and in turn affect the coloring in some cases. The medium transportation information is conditions under which the printing medium is transported, such as the transportation speed permitted to the medium after printing, the tension applied to the printing medium during the transportation, and other pieces of information. The cockles are rippling of the printing medium caused by ink absorbed by the printing medium when printing is performed with the ink. The likelihood of the cockles ultimately leads to occurrence of color unevenness and other problems that affect the image quality. The processing information is not limited to those listed above, and other pieces of processing information may be used when different printing methods or processing methods are employed. For example, in the case of printing with a thermal sublimation printer, the temperature to which the print head is heated and the amount of correction of the heating temperature may be handled as the processing information. In the case of printing with a dot impact printer, the voltage applied to the piezoelectric device and the waveform of the applied voltage may be handled as the processing information. In the case of regeneration of a printing medium, the temperature at which the printing medium on which printing has been performed is dissolved, the concentration of the solvent used in the dissolution, and the processing period of the dissolution can be handled as the processing information.

(5) In the configuration described above, when the identification section can identify the printing target media as a learned printing medium, at least one of the pieces of processing information from [1] to [6] described above, which are associated with the printing medium, may be read from the processing information storage section in accordance with the result of the identification and used to process the printing target media. The processing can therefore be properly and readily performed. The use of the processing information used herein includes not only use of the processing information stored in advance as it is but also use of the processing information stored in advance with part of the processing information corrected.

(6) In the configuration described above, the processing of the printing medium may be printing performed on the printing target medium by using coloring and printing material producing at least the three primary colors and black. The printing can thus be performed under conditions suitable for the printing medium on which printing is to be performed, whereby high-quality printing can be achieved. The coloring and printing material may be inks or toners in the first place. In the case of inks, any kind of ink may be used, including dye inks, pigment inks, and inks used for thermal sublimation. The coloring and printing materials may contain a coloring material producing a color other than the three primary colors and black.

(7) In the configuration described above, the printing medium processing system may further include a transfer learning section that performs transfer learning using the learned model described above when the identification section determines that the printing target medium described above is not a learned printing medium to increase the number of output layers of the learned model and generates a new learned model. As a result, even when an unlearned printing medium is used, the learned model can be updated in short man-hours, whereby a new printing medium can be handled. In the transfer learning, only the number of output layers may be increased, or the number of output layers and the number of one or more other layers may be increased. The transfer learning section, which performs the transfer learning, may be provided in the identification section, or may be provided separately from the identification section. In the case of a separate transfer learning section, for example, the transfer learning section may be disposed in a cloud space, the transfer learning section may perform the transfer learning via a network, and a learned model generated by the transfer learning may be sent back to the identification section via the network or by using any other method.

(8) In the configuration described above, when the transfer learning section performs the transfer learning to generate a new learned model having an increased number of output layers, the learned model stored in the model storage section may be updated. The latest learned model can thus be used to identify the kind of the printing medium. The learned model may be updated whenever the kind of the printing medium is identified or at predetermined timings, for example, at fixed intervals.

(9) A second aspect of the present disclosure is configured in the form of a printing medium processing method. The printing medium processing method includes handling a plurality of kinds of printing media and storing a learned model generated in advance by machine learning that uses, as learning data, at least five pieces of spectral information produced from locations printed in three primary colors of coloring and printing materials and black and a paper white portion of each of the printing media, identifying the kind of a printing target medium on which printing is to be performed by applying the at least five pieces of spectral information produced from the printing target medium to the learned model, and processing the printing target medium in accordance with the identified kind of the printing target medium. As a result, for the plurality of kinds of printing medium, the at least five pieces of spectral information produced from the results of the printing of the paper white of the printing medium, black, and the three primary colors of the coloring and printing materials can be acquired, and the kind of the printing target medium can be identified by using the result of teacher-assisted machine learning performed in advance based on the acquired spectral information. There is therefore no need to use a special parameter that allows distinction of image quality characteristics, and the kind of a printing medium P can be identified in the simple method.

(10) In each of the embodiments described above, part of the configuration achieved by hardware may be replaced with software. At least part of the configuration achieved by software may be achieved by a discrete circuit configuration. When part or entirety of the functions in the present disclosure is achieved by software, the software (computer program) can be provided in the form of a computer readable recording medium that stores the software. The "computer readable recording medium" is not limited to a portable recording medium, such as a flexible disk and a CD-ROM, and includes an internal storage device in a computer, such as a variety of RAMS and ROMs, and an external storage device fixed to the computer, such as a hard disk drive. That is, the "computer readable recording medium" has a wide meaning including an arbitrary recording medium capable of permanently storing a data packet instead of temporal storage.

The present disclosure is not limited to the embodiments described above and can be achieved in a variety of configurations to the extent that they do not depart from the substance of the present disclosure. For example, the technical features described in the embodiments and corresponding to the technical features in the aspects described in the paragraph of Summary can be replaced with other features or combined with each other as appropriate to solve part or entirety of the problems described above or achieve part or entirety of the effects described above. Furthermore, when any of the technical features has not been described as an essential feature in the present specification, the technical feature can be deleted as appropriate.

What is claimed is:

1. A printing medium processing system that identifies a kind of a printing medium, the system comprising:
    a model storage section that handles a plurality of kinds of printing media and stores a learned model generated in advance by machine learning that is performed by defining, as a teacher data, at least five pieces of spectral information and a plurality of identifiers indicating the plurality of kinds of printing media, and by using a training model, the at least five pieces of the spectral information being produced from locations printed in three primary colors of coloring and printing materials and black and a paper white portion of each of the printing media, the at least five pieces of the spectral information and each of the plurality of identifiers being associated with each other; and
    a processor that controls printing based on processing information in accordance with a kind of a printing target medium which is identified, prior to performing the printing on the printing target medium, by data on at least five pieces of spectral information, which are produced from locations printed in three primary colors of coloring and printing materials and black and a paper white portion of the printing target medium, being applied to the learned model, the printing target medium being a medium on which the printing is to be performed.

2. The printing medium processing system according to claim 1, wherein the three primary colors of the coloring and printing materials are cyan, magenta, and yellow.

3. The printing medium processing system according to claim 1, wherein the spectral information used as the teacher data includes at least one of spectral reflectance or spectral transmittance obtained by measuring a color of results of the printing or a spectral image obtained by capturing images of the results of the printing.

4. The printing medium processing system according to claim 1, further comprising:
    a processing information storage section that stores at least one kind of pieces of the processing information in advance in association with the kind of any of the printing media,
    the processing information being used in printing using the printing medium and including
    [1] a color conversion LUT, which converts image data into amounts of coloring and printing materials,
    [2] an ICC profile,
    [3] heating control information, which is conditions under which the printing medium is heated after printing,
    [4] medium transportation information, which is conditions under which the printing medium is transported,
    [5] a duty limit value indicating an upper limit of an amount of ink applicable to the printing medium when coloring and printing materials are inks for printing, and
    [6] information on likelihood of cockles of the printing medium, wherein
    the processor controls the printing based on the processing information which is read from the processing information storage section in accordance with the kind of the printing target medium which has been identified.

5. The printing medium processing system according to claim 4, wherein when the printing target medium is a learned printing medium, the processor controls the printing based on at least one of the pieces of processing information from [1] to [6], which is read from the processing information storage section in accordance with the result of the identification.

6. The printing medium processing system according to claim 4, wherein the processor controls the printing on the printing target medium by using coloring and printing material producing at least the three primary colors and black.

7. The printing medium processing system according to claim 1, wherein when the printing target medium is not a learned printing medium, the processor controls the printing based on the processing information in accordance with the kind of the printing target medium, after a new learned model is generated by performing transfer learning using the learned model and increasing the number of output layers of the learned model.

8. The printing medium processing system according to claim 7, wherein when the new learned model having an increased number of output layers is generated, the learned model stored in the model storage section is updated.

9. A printing medium processing method for identifying a kind of a printing medium, the method comprising:

handling a plurality of kinds of printing media and storing a learned model generated in advance by machine learning that is performed by defining, as a teacher data, at least five pieces of spectral information and a plurality of identifiers indicating the plurality of kinds of printing media, and by using a training model, the at least five pieces of the spectral information being produced from locations printed in three primary colors of coloring and printing materials and black and a paper white portion of each of the printing media, the at least five pieces of the spectral information and each of the plurality of identifiers being associated with each other;

identifying, prior to performing printing on a printing target medium, a kind of the printing target medium on which printing is to be performed, by applying, to the learned model, data on at least five pieces of spectral information produced from locations printed in three primary colors of coloring and printing materials and black and a paper white portion of the printing target medium; and processing the printing target medium in accordance with the identified kind of the printing target medium.

* * * * *